United States Patent
Osborn et al.

(10) Patent No.: US 12,244,725 B2
(45) Date of Patent: Mar. 4, 2025

(54) SYSTEMS AND METHODS FOR TOKEN AUTHENTICATION

(71) Applicant: Capital One Services, LLC, McLean, VA (US)

(72) Inventors: Kevin Osborn, Newton Highlands, MA (US); David Kelly Wurmfeld, Palm Bay, FL (US)

(73) Assignee: Capital One Services, LLC, McLean, VA (US)

( * ) Notice: Subject to any disclaimer, the term of this patent is extended or adjusted under 35 U.S.C. 154(b) by 176 days.

(21) Appl. No.: 17/735,917

(22) Filed: May 3, 2022

(65) Prior Publication Data
US 2023/0362013 A1    Nov. 9, 2023

(51) Int. Cl.
*H04L 9/32* (2006.01)
*B42D 25/378* (2014.01)

(52) U.S. Cl.
CPC .......... *H04L 9/3242* (2013.01); *B42D 25/378* (2014.10); *H04L 9/3268* (2013.01)

(58) Field of Classification Search
CPC ... H04L 9/3242; H04L 9/3268; H04L 9/3213; H04L 9/0816; B42D 25/378; B42D 25/30; G06K 7/12; G07D 7/00; G07D 7/12
USPC ........... 283/72, 67, 70, 74, 85, 91, 117, 901; 356/71
See application file for complete search history.

(56) References Cited

U.S. PATENT DOCUMENTS

| | | | |
|---|---|---|---|
| 7,152,786 B2 | 12/2006 | Brundage et al. | |
| 7,207,480 B1 | 4/2007 | Geddes | |
| 10,747,859 B2 | 8/2020 | Ahuja et al. | |
| 10,747,869 B1 | 8/2020 | Wurmfeld et al. | |
| 10,885,410 B1 * | 1/2021 | Rule | G06Q 20/3226 |
| 11,200,439 B1 | 12/2021 | Fraser | |
| 11,281,789 B2 * | 3/2022 | Bilger | H04L 9/0897 |
| 12,034,718 B2 | 7/2024 | Mohanty | |
| 2005/0058320 A1 | 3/2005 | Rhoads et al. | |
| 2017/0177852 A1 * | 6/2017 | Krawczyk | G06F 21/36 |
| 2023/0356539 A1 * | 11/2023 | Osborn | G07D 7/00 |
| 2023/0362012 A1 * | 11/2023 | Osborn | G09C 5/00 |

OTHER PUBLICATIONS

Extended European Search Report issued in European Application No. 23171124.3 on Sep. 14, 2023.
Notice of Allowance issued in U.S. Appl. No. 17/735,892 on Jul. 23, 2024.

* cited by examiner

*Primary Examiner* — Hoa Q Pham
(74) *Attorney, Agent, or Firm* — Foley & Lardner LLP

(57) ABSTRACT

In some embodiments, an authentication system may be configured to process one or more tokens that incorporates one or more tailored-wavelength-range coded patterns, codes represented within a steganographic image, or "overlapping" codes. As an example, such a token may include (i) one or more invisible-ink-printed patterns printed using infrared ink corresponding to different tailored wavelength ranges within the infrared light spectrum, (ii) one or more steganographic images in which invisible-ink-printed patterns are interweaved within the steganographic images, (iii) visible-ink-printed patterns and invisible-ink-printed patterns printed substantially within the visible ink portions of the visible-ink-printed patterns, or (iv) other features, where the invisible-ink-printed patterns correspond to one or more authentication codes or other data for token authentication.

20 Claims, 9 Drawing Sheets

250

Pattern 204

Pattern 206

Pattern 208

SYSTEMS AND METHODS FOR TOKEN AUTHENTICATION

BACKGROUND

Tokens can be used in encryption, networking, message passing, and other applications. For example, physical tokens may be used to facilitate physical entry, account access, or identity verification, and authentication systems are used to authenticate whether such tokens are valid for such purposes. Although some authentication systems electronically communicate with physical tokens to perform challenge-response authentication, other authentication systems may additionally or alternatively perform authentication based on physical features of a physical token (e.g., watermarks, threads, color-changing ink, etc.).

SUMMARY

Conventional computing systems may perform authentication based on physical features of a physical token. As an example, conventional systems may involve the use of an authentication code printed on a physical token to determine whether a token is authentic. However, the authentication code may be copied by malicious actors to create fake tokens. Other conventional systems may additionally or alternatively add a combination of watermarks, security threads, or color-changing ink to a physical token to make copying of such token more difficult. While these security features do deter the most common malicious actors, they are usually intended to be noticeable to the naked human eye or to become noticeable when the token is photocopied using a typical office photocopier (e.g., watermarks that vividly appear on photocopied versions of a token). Although the primary intent of such features may be to help humans detect visual differences between a token and its fake counterpart, these features also help malicious actors visually assess how authentic looking their fake tokens are.

To address these or other issues, non-conventional techniques described herein may incorporate the use of one or more tailored-wavelength-range coded patterns (e.g., corresponding to multiple wavelength ranges within the infrared light spectrum), codes represented within a steganographic image, or "overlapping" codes. In some embodiments, an authentication system may be configured to process one or more tokens with one or more of the foregoing or following features (and as further described herein).

In some embodiments, a token may include one or more steganographic images and one or more invisible-ink-printed patterns (e.g., infrared printed patterns, near-infrared (NIR) printed patterns, ultraviolet printed patterns, or any type of printed patterns which are generally invisible to the naked eye of typical humans) interweaved within the steganographic images, where the invisible-ink-printed patterns correspond to one or more authentication codes (e.g., for verifying text or other data printed or stored in memory of the token) or other data for token authentication (e.g., location information indicating one or more locations of one or more other patterns on the token, order information indicating an order in which one or more portions of an authentication code or other data should be combined, etc.). In this way, even where such a token is photocopied, the photocopy in some embodiments may not demonstrate significant visual differences from the original token (e.g., as compared to tokens with certain conventional security features). For example, the steganographic images may appear substantially the same regardless of whether the patterns become visible (e.g., after being photocopied and printed with typical ink visible to the naked human eye).

In some embodiments, a token may include one or more visible-ink-printed patterns (e.g., which are generally visible to the naked eye of typical humans) and one or more invisible-ink-printed patterns that are printed substantially within the visible-ink portions of the visible-ink-printed patterns, where the invisible-ink-printed patterns correspond to one or more authentication codes or other data for token authentication. Thus, even if such a token is photocopied, the photocopy may appear substantially the same as the original token. When authenticated by an authentication system that scans for and detects invisible-ink-printed patterns, however, the invisible-ink-printed patterns may no longer exist on a fake token created based on the photocopy, thereby indicating to the authentication system that the fake token is not a valid token.

In some embodiments, a token may include one or more invisible-ink-printed patterns printed using infrared ink corresponding to different tailored wavelength ranges within the infrared light spectrum, where the invisible-ink-printed patterns correspond to one or more authentication codes or other data for token authentication. As an example, a first pattern of the token may be printed with infrared ink corresponding to a first wavelength range within 780 nm and 1000 nm (or 780 nm and 2500 nm for NIR-ink-printed patterns); a second pattern of the token may be printed with infrared ink corresponding to a second wavelength range within 780 nm and 1000 nm (or 780 nm and 2500 nm for NIR-ink-printed patterns) that is different from the first wavelength range; a third pattern of the token may be printed with infrared ink corresponding to a third wavelength range within 780 nm and 1 mm that is different from the first and second wavelength ranges (or within 780 nm and 2500 nm for NIR-ink-printed patterns); and so on. As another example, a first portion of a pattern of the token may be printed with infrared ink corresponding to the first wavelength range; a second portion of the pattern may be printed with infrared ink corresponding to the second wavelength range; and so on. In some embodiments, two or more of the invisible-ink-printed patterns may overlap with one another on the token (e.g., additionally or alternatively to the overlapping manners described above with respect to the steganographic images or visible-ink-printed patterns). In this way, for example, even if a malicious actor uses an infrared scanner (e.g., a broadband infrared scanner) to read the patterns for copying purposes, the multiple patterns may be detected incorrectly as a single pattern or otherwise produce other errors unnoticed by the malicious actor. For example, an error may occur from reading any portion of one pattern as part of a different pattern (e.g., due to the use of an infrared scanner without modes that accurately read invisible-ink-printed patterns corresponding to the tailored wavelength ranges). In an alternative embodiment, either one of or both the first and second patterns of the token may be printed with ultraviolet ink corresponding to a further wavelength range within 100 nm and 400 nm.

Various other aspects, features, and advantages of the disclosure will be apparent through the detailed description of the disclosure and the drawings attached hereto. It is also to be understood that both the foregoing general description and the following detailed description are examples and not restrictive of the scope of the disclosure. As used in the specification and in the claims, the singular forms of "a," "an," and "the" include plural referents unless the context clearly dictates otherwise. In addition, as used in the specification and the claims, the term "or" means "and/or" unless the context clearly dictates otherwise. Additionally, as used in the specification, "a portion," refers to a part of, or the entirety of (i.e., the entire portion), a given item (e.g., data) unless the context clearly dictates otherwise.

DETAILED DESCRIPTION OF THE DRAWINGS

In the following description, for the purposes of explanation, numerous specific details are set forth in order to provide a thorough understanding of the disclosure. It will be appreciated, however, by those having skill in the art, that the disclosure may be practiced without these specific details or with an equivalent arrangement. In other cases, some structures and devices are shown in block diagram form to avoid unnecessarily obscuring the disclosure.

Figure 1:
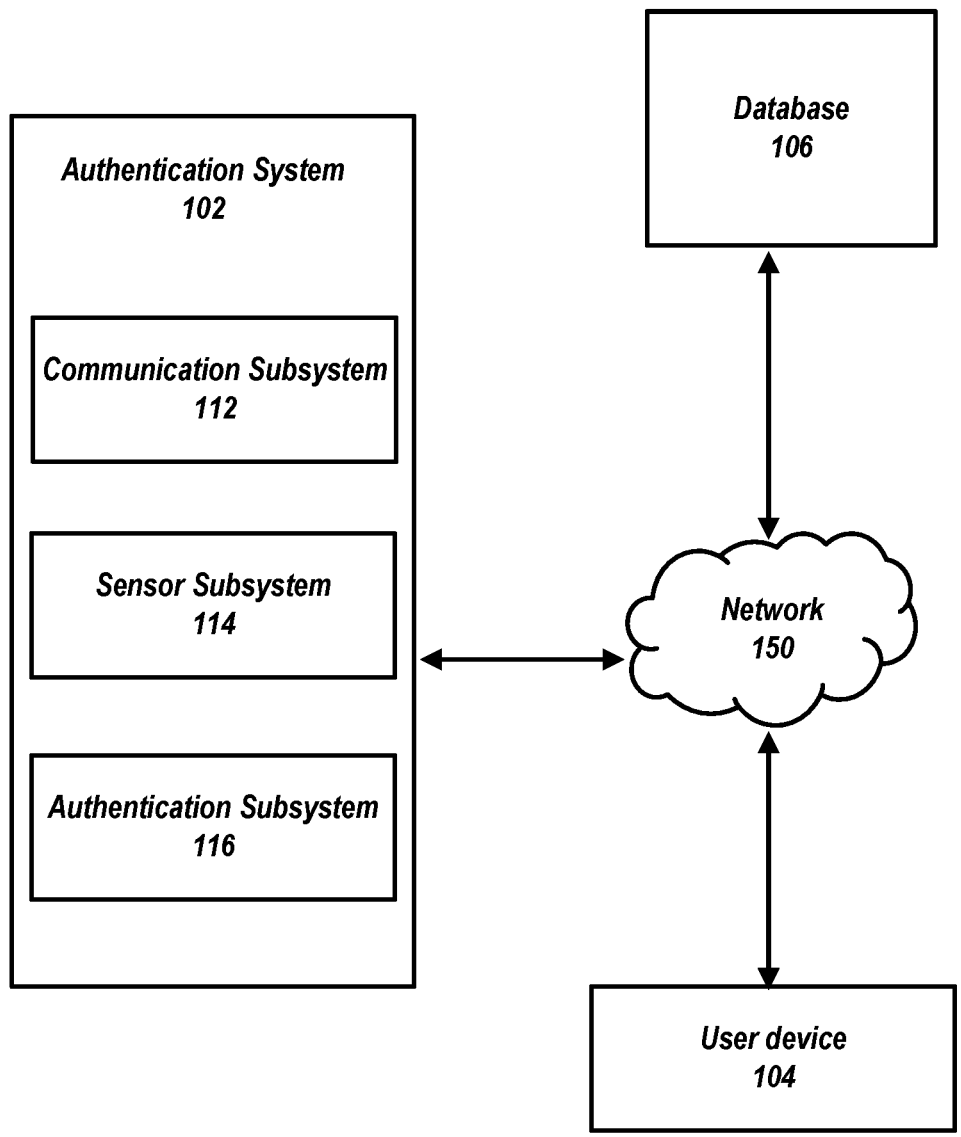
FIG. 1 shows an example system for using machine learning and lineage data to manage data, in accordance with some embodiments.

FIG. 1 shows an example computing system 100 for authenticating tokens. The system 100 may include an authentication system 102, a user device 104, or a database 106. The authentication system 102 may include a communication subsystem 112, a sensor subsystem 114, an authentication subsystem 116, or other components.

In some embodiments, the system 100 may obtain text of a token that has been presented for authentication. The system 100 may use the text to generate a first code. The first code may be generated using a secret key or text of the token, and the first code may be compared with a second code to determine whether any of the text on the token has been changed. By determining whether any text on the token has changed, the system may determine whether the token is authentic or whether a malicious actor is attempting fraudulent activity. The second code may be located on the token and may have been generated using the authentic text of the token (e.g., the second code may have been generated and printed on the token at the time the token was created).

To prevent a malicious actor from simply copying the code or modifying text of the token such that it can be used to create a code that matches the second code, the second code may be hidden or otherwise obfuscated on the token. For example, the code may be printed in infrared fluorescent ink, ultraviolet fluorescent ink, or other ink (e.g., invisible ink) that is detectable only if scanned using a particular wavelength of light. As used herein, invisible may mean not visible to the human eye or beyond the visible spectrum for humans. An invisible-ink-printed pattern may include an infrared printed pattern, a near-infrared (NIR) printed pattern, an ultraviolet printed pattern, or any type of printed pattern which are generally invisible to the naked eye of typical humans. Additionally or alternatively, the code may be hidden in a steganographic image printed on the token.

The second code may be printed using an invisible ink (e.g., infrared fluorescent ink, ultraviolet fluorescent, or a variety of types of ink that are generally invisible to the naked eye of typical humans) on the token. A scanner may be used to scan the token using a particular wavelength of the electromagnetic spectrum so that the second code may be detected. The system 100 may not initially know what wavelength to use to detect the second code and may need to determine what wavelength to use based on information located on the token. For example, the system 100 may use information printed on the token (e.g., text of the token, time, date, etc.) to determine a first wavelength. The first wavelength may be used to detect a pattern (e.g., printed on the token) that indicates a second wavelength that may be used to detect the second code. The system 100 may use the second wavelength to scan the token and detect a second pattern that includes the second code.

Additionally or alternatively, the second code may be stored in a first steganographic image of many steganographic images on the token. The system 100 may use text on the token to determine the location of the first steganographic image. For example, a date associated with the token may indicate that the steganographic image in the top left corner of the token contains the second code. The information may also indicate a wavelength to use to scan and detect the steganographic image, for example, if the steganographic image is printed in invisible ink.

Additionally or alternatively, the second code may be split into multiple portions. Each portion of the second code may be printed using a different invisible ink. For example, a first wavelength range may be needed to detect a first portion of the second code (e.g., printed in infrared fluorescent ink), and a second wavelength range may be needed to detect a second portion of the second code (e.g., printed in ultraviolet fluorescent ink). Multiple patterns corresponding to different portions of the second code may be printed such that the patterns overlap with one another. Overlapping patterns corresponding to the different portions of the second code provide the benefit of making it more difficult to detect distinct portions of the code, and thus increase the security of the token.

In some embodiments, sensor subsystem 114 may be configured to operate in a plurality of modes (e.g., invisible ink modes) and may be capable of reading patterns printed in invisible ink. The plurality of invisible ink modes may include a first mode (e.g., infrared mode, ultraviolet mode, or other invisible ink mode) corresponding to a first wavelength or wavelength range within the electromagnetic spectrum (e.g., within the infrared light spectrum or the ultraviolet light spectrum) and a second mode corresponding to a second wavelength range that is different from the first wavelength or wavelength range. For example, the first mode may allow the sensor subsystem 114 to detect infrared ink with a peak excitation around 793 nm or peak emission around 840 nm (e.g., by emitting and filtering for infrared light within the wavelength range of 793 nm-840 nm). As an additional example, the second mode may allow the sensor subsystem 114 to detect infrared ink that has a peak excitation around 824 nm or peak emission around 885 nm (e.g., by emitting and filtering for infrared light within the wavelength range of 824 nm-885 nm). As an additional example, a code, pattern, or a steganographic image may be printed using ink that is visible in light that has a wavelength between 380 nm and 700 nm. In some embodiments, a code, pattern, or a steganographic image (e.g., such as patterns 204-208 of FIG. 3A, or patterns 322, and 324a-324c of FIGS. 3B-3C as discussed in more detail below) may be printed on a token using ink that is visible in light that has a wavelength between 700 nm and 1000 nm. One or more of the patterns of a token may be printed with ultraviolet ink corresponding to a further wavelength range within 100 nm and 400 nm.

A token may include a document, such as a check (e.g., a cashier's check), a money order, a contract, an electronic document, or other documents. A token may include a credit card, a debit card, or other tool used for making payments. The authentication system 102 may determine text on a token that has been presented to the authentication system. For example, a user may insert a token into the authentication system 102 and the authentication system 102 may scan the document or take an image of the document (e.g., using a camera). The authentication system 102 may detect text on the document, for example, through the use of optical character recognition (OCR). The text on the document may include one or more names (e.g., a payee, a payor, etc.), one or more account numbers, a date of the token (e.g., the date the token was created), a security code (e.g., if the token is a credit card or other token that uses a security code), or other information.

Figure 2:
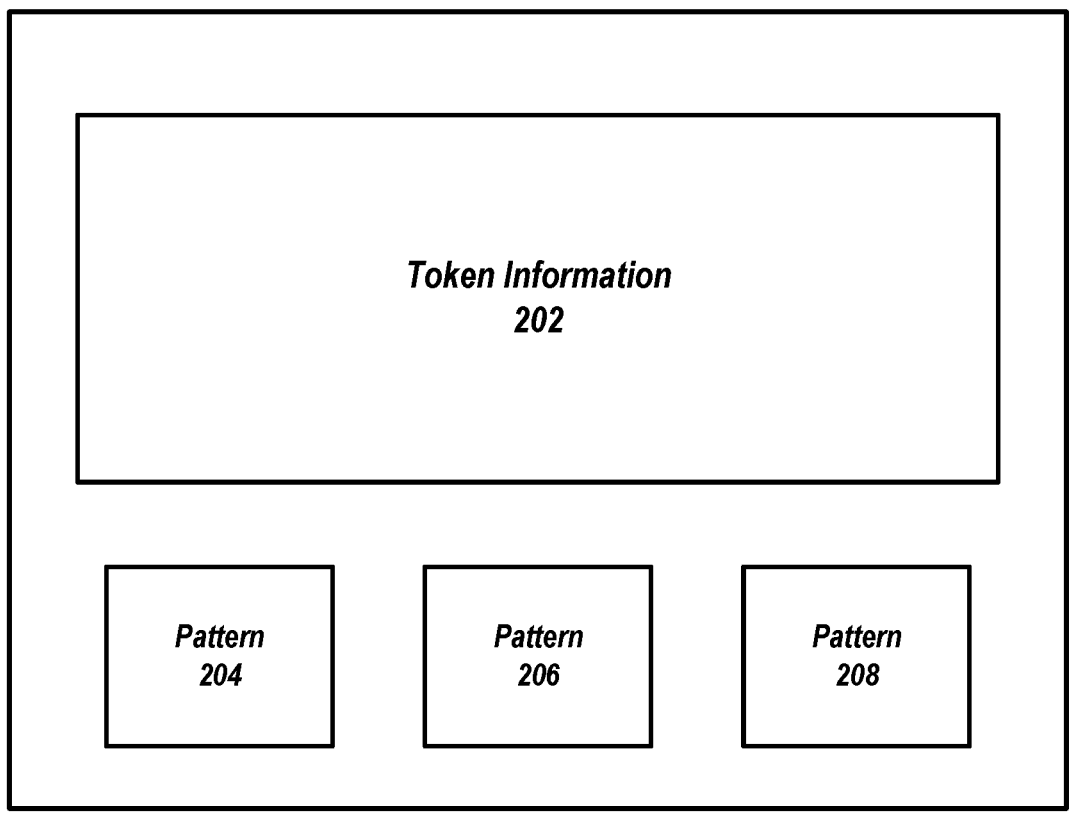
FIG. 2 shows an example token for authentication, in accordance with some embodiments.

Referring to FIG. 2, an example token 200 is shown. The token may include token information 202, which may include the text on the token as explained above. The token 200 also includes patterns 204-208. Each pattern may be printed on the token in different ink. The ink may be visible to the human eye or may be visible only using wavelengths in the electromagnetic spectrum corresponding to infrared light or ultraviolet light. Each pattern may contain different information that may allow the authentication system 102 to authenticate the token 200. For example, pattern 204 may indicate a wavelength that can be used to detect pattern 206, and pattern 206 may include the second code. Alternatively, each of patterns 204-208 may include a separate steganographic image, one of which includes the second code. The authentication system may determine the steganographic image that contains the code based on text of the token as described in more detail below. Alternatively, each of patterns 204-208 may correspond to a portion of the second code and may be combined to generate the second code (e.g., as explained in more detail below).

The authentication system 102 may use the text or a first portion of the text (e.g., any of the text included in token information 202 of FIG. 2) detected on the token to generate a first code. The first code may be representative of the text on the token, and the first code may be compared with a second code to determine whether any of the text of the token has been altered (e.g., by a malicious actor). The first code may be a message authentication code that is generated using a portion of the text and a secret key. For example, the authentication system 102 may input the text or a portion of the text (e.g., the account number) and a secret key into a function that computes a hash-based message authentication code. The text may be concatenated with a secret key prior to being input into the function that computes a hash-based message authentication code. In some embodiments, the secret key may be a public key of a key pair. The authentication system 102 may determine that the secret key is valid. For example, the authentication system 102 may determine a third-party certificate on the token, and may determine, based on a second public key corresponding to the third-party, that the third-party certificate is valid.

Figure 3A:
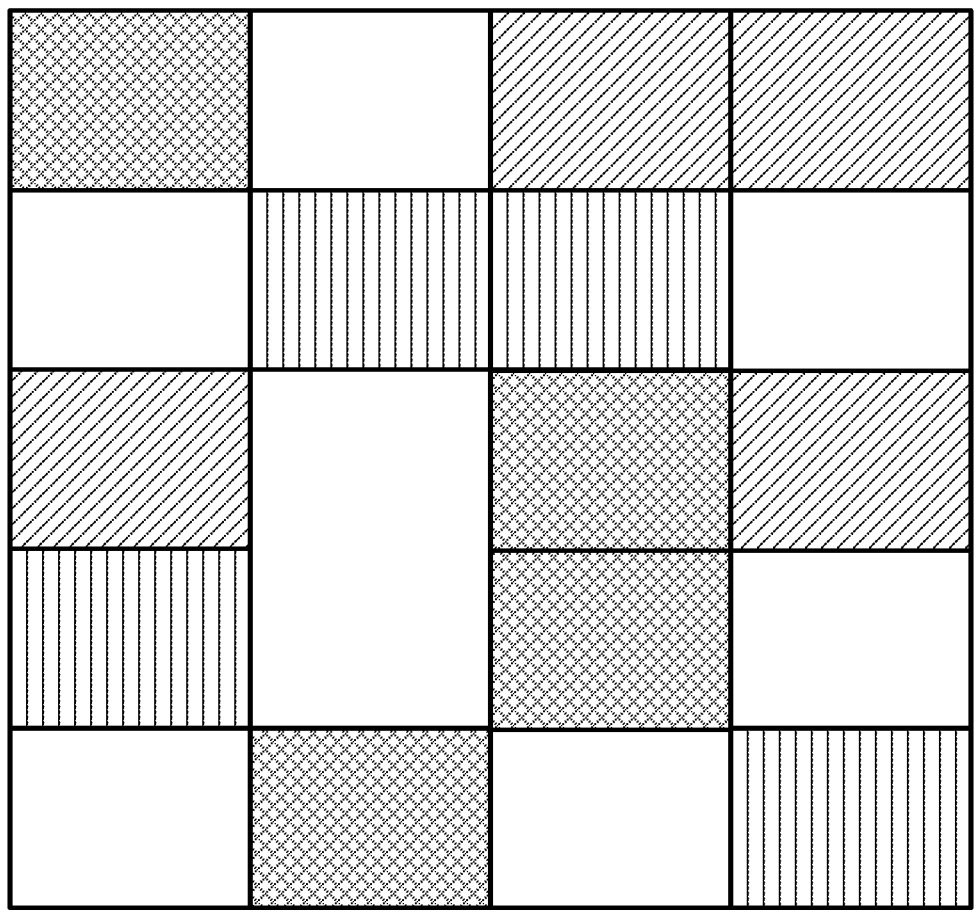
FIG. 3A shows an example code that can be used to authenticate a token, in accordance with some embodiments.
Figure 3A:
Figure 3A:
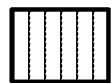
Figure 3A:
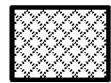
Figure 3B:
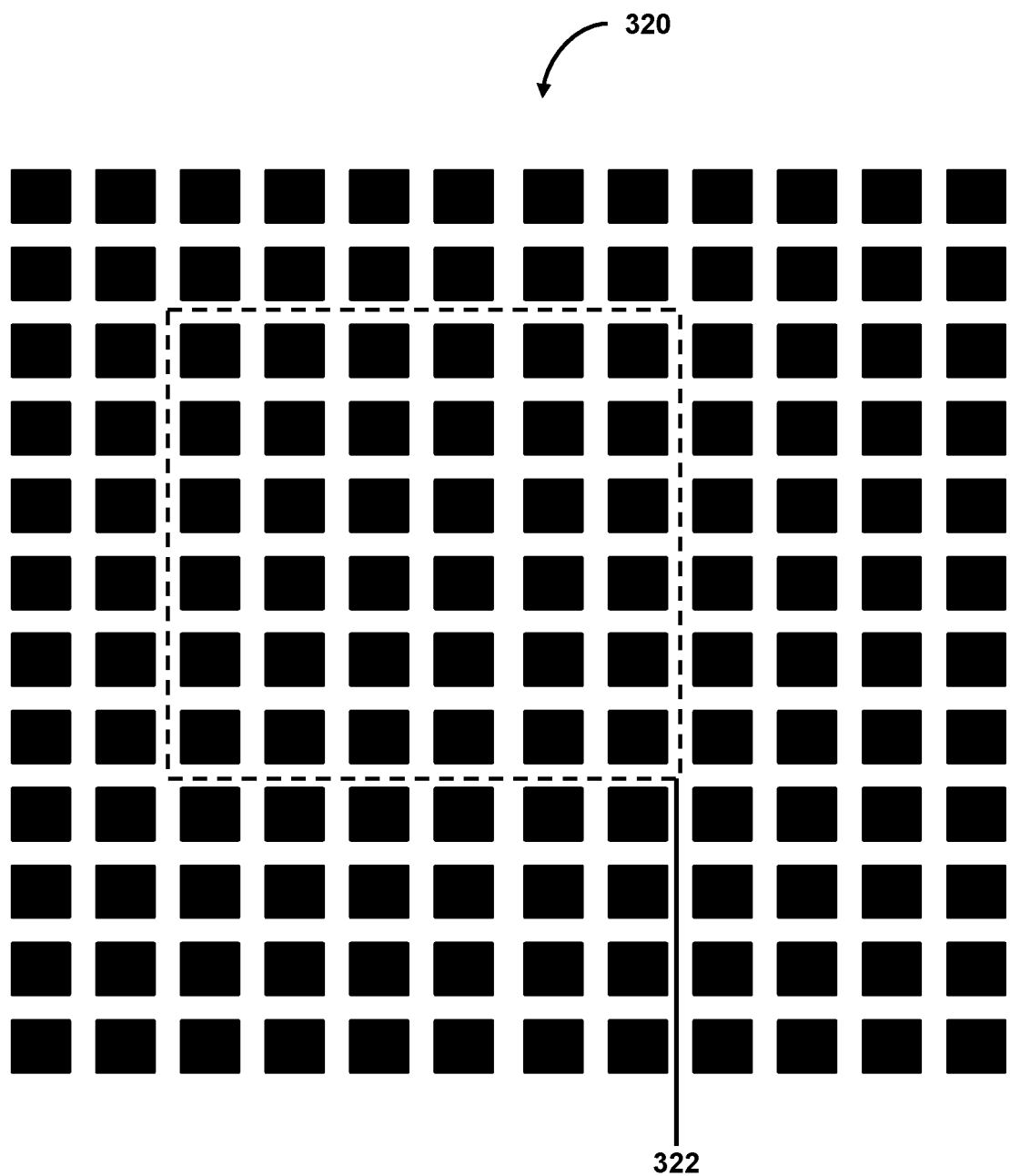
FIG. 3B shows an example image that can be used to hide one or more codes, in accordance with some embodiments.
Figure 3C:
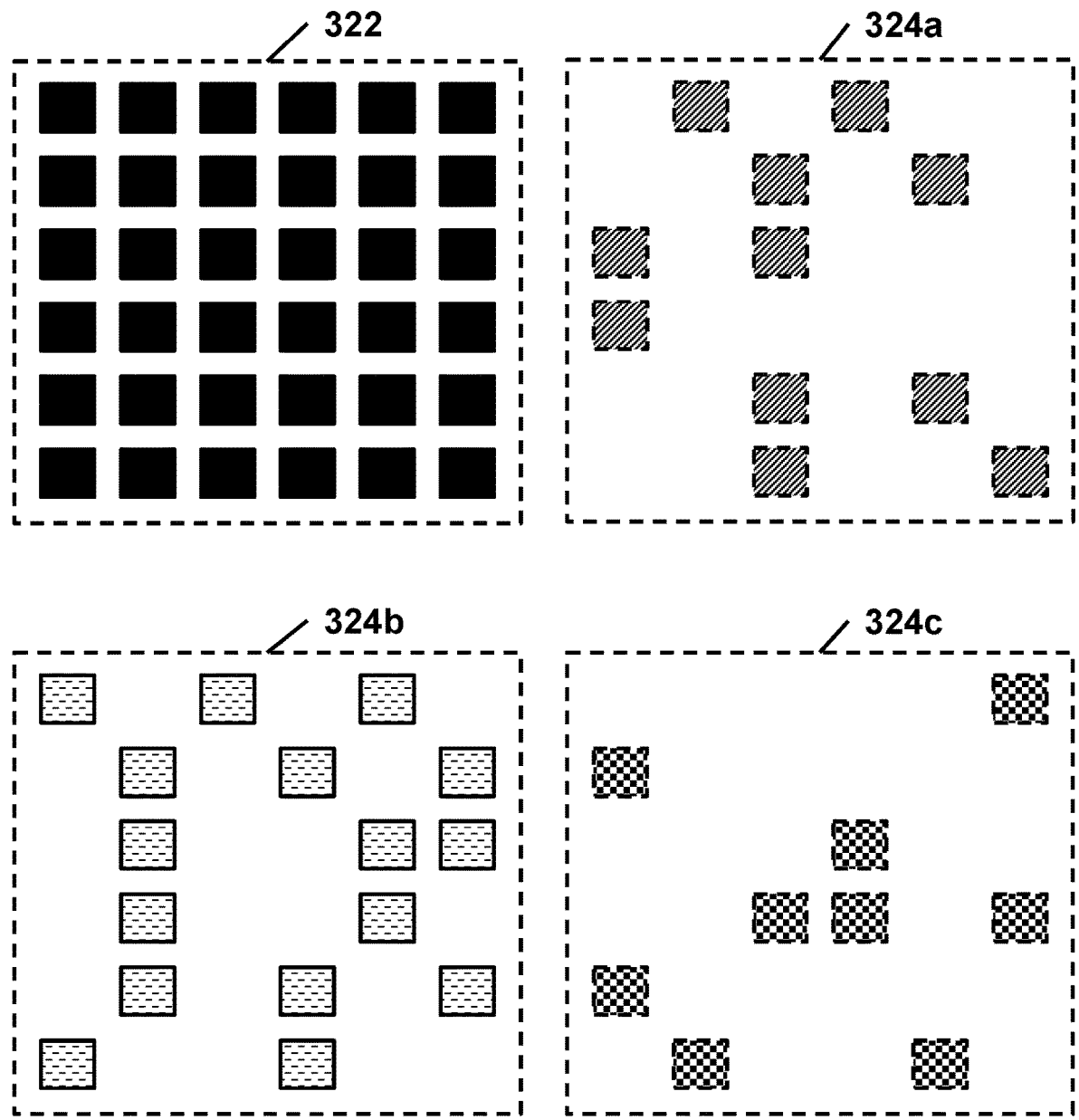
FIG. 3C shows an example of overlapping patterns, in accordance with some embodiments.

The authentication system 102 may obtain the second code in a variety of ways. For example, the second code may be printed on the token in invisible ink or the second code may be hidden in a steganographic image on the token (e.g., as shown in FIGS. 3A-3C and discussed in more detail below). The second code may be a message authentication code that matches the first code. The authentication system 102 may determine that text on the token has been changed, for example, if the second code does not match the first code.

In some embodiments, there may be multiple patterns printed in invisible ink on the token. A first pattern may include or indicate a wavelength range that may be used to detect a second pattern printed on the token. The second pattern may include or indicate the second code. The authentication system 102 may determine an invisible ink detecting mode to detect the first pattern. The invisible ink detecting mode may be determined based on information printed on the document. For example, if the date of the document is before a threshold date (e.g., July 1), the authentication system 102 may determine to use a first wavelength range and if the date is after the threshold date, the authentication system 102 may determine to use a second wavelength range to detect the first pattern. The authentication system may generate a hash of a portion of the text (e.g., a second portion of text that is different from the first portion of text used to generate the first code as described above) and if the hash is within a first range, the authentication system 102 may determine to use a first mode (e.g., corresponding to a first wavelength range) to detect the first pattern. In other embodiments each pattern may correspond to a different portion of the second code as explained in more detail below.

In some embodiments, the authentication system 102 may retrieve a data structure (e.g., from the database 106) that may indicate what wavelength to use to detect invisible ink printed on the token. For example, the authentication system 102 may retrieve a data structure that indicates a plurality of wavelengths and a plurality of dates. Each date of the plurality of dates may be mapped to a wavelength of the plurality of wavelengths. The authentication system 102 may determine, based on the data structure and the date, the first wavelength range that may be used to detect a first pattern on the token.

In some embodiments, the authentication system 102 may generate a hash value (e.g., a cryptographic hash) using the text of the token. The authentication system 102 may use the hash to determine the first wavelength range or first mode to use to detect the first pattern. For example, if the hash is greater than a threshold value, the authentication system may determine to use a first filter mode (e.g., corresponding to the first wavelength range) to detect the first pattern (e.g., pattern 204).

The authentication system 102 may extract an invisible ink detecting mode indicator from the token. For example, the authentication system 102 may cause the sensor subsystem 114 to operate in the first invisible ink detecting mode to enable the system 102 to detect the first pattern. The invisible ink detecting mode indicator may indicate a second wavelength range (e.g., within the infrared light or ultraviolet light spectrum) that can be used to detect the second code. The authentication system 102 may cause the sensor subsystem 114 to operate in a first mode corresponding to the wavelength range indicated by the first pattern. The mode indicated by the first pattern may allow the authentication system 102 to detect the second code on the token. For example, the first pattern may include information that indicates the wavelength range to use to detect the second code.

The authentication system 102 may extract or determine a second code from the token. For example, the authentication system 102 may set the sensor subsystem 114 to operate in a second mode indicated by the first pattern (e.g., pattern 204 of FIG. 2). The authentication system 102 may cause the sensor subsystem 114 to operate in the second mode corresponding to the second wavelength range so that the second code can be detected. The authentication system 102 may use the sensor subsystem 114 to extract the second message code from the token. For example, the authentication system 102 may scan, using the second mode, the token to determine the second code.

In some embodiments, the second code may be represented by a plurality of different patterns on the token. The plurality of patterns may be printed in invisible ink on the token, and each pattern may represent a different portion of the second code.

In one use case, referring to FIG. 3A, an example of overlapping patterns that represent a second code are shown. The overlapping patterns 250 may appear at the location of pattern 204 as shown in FIG. 2 or other locations on the token. The overlapping patterns 250 include pattern 204, pattern 206, and pattern 208. Pattern 204 may correspond to a first portion of the second code, pattern 206 may correspond to a second portion of the second code, and pattern 208 may correspond to a third portion of the second code. Each of patterns 204-208 may be printed on the token using a different ink (e.g., infrared ink, NIR ink, ultraviolet ink, visible ink, etc.) that may be detectable at different wavelength ranges. For example, pattern 204 may be printed in infrared ink that is detectable under a first wavelength range, pattern 206 may be printed in ultraviolet ink that is detectable under a second wavelength range, and pattern 208 may be printed in ink that is visible to the human eye (e.g., visible with a wavelength range between 400 nm to 700 nm). Additionally or alternatively, the patterns 204-208 may be printed in any combination of invisible and/or visible ink. In some embodiments, the ink associated with a first pattern may be printed on top of or over ink associated with a second pattern. The sensor subsystem 114 may detect the first pattern using a first infrared mode and may detect the second pattern using a second infrared mode. Each pattern may be converted into a portion of the second code. For example, the sensor subsystem 114 may scan the pattern and the authentication system 102 may determine a portion of the second code, which may include a sequence of numbers or letters.

In some embodiments, the authentication system 102 may extract the second code from a steganographic image on the token. The token may include a plurality of steganographic images. The steganographic images may be printed on the token in invisible ink. The authentication system 102 may determine (e.g., via the sensor subsystem 114) the plurality of steganographic images on the token. For example, the authentication system 102 may detect the steganographic images using the first mode that was determined based on text of the document to detect the steganographic images.

The second code may be hidden in one steganographic image of the plurality of steganographic images. The authentication system 102 may determine the steganographic image that contains the second code, for example, based on text on the token. For example, the authentication system 102 may use the text or a portion of the text to generate a value (e.g., a hash, a cryptographic hash, etc.). The value may be compared with one or more thresholds to determine the steganographic image that contains the second code. For example, the authentication system 102 may determine that the second code is in the steganographic image located in the bottom right corner if the value generated is between a first threshold value and a second threshold value. The authentication system 102 may determine that the second code is in the steganographic image located in the bottom left corner of the token if the value generated is between a second threshold value and a third threshold value.

As an example, referring to FIG. 3B, image 320 (or pattern 320) may be a steganographic image. The image 320 may be located on a token (e.g., token 200 described in FIG. 2). For example, the image 320 may be part of patterns 204-208 as described in FIG. 2. A pattern 322 of the image 320 may include the second code or a portion of the second code. One or more portions of pattern 322 may be printed using visible ink or invisible ink. For example, referring to FIG. 3C, pattern 322 may be printed using black ink that is visible to the human eye. Each of patterns 324b-324c may correspond to a different portion of the second code (e.g., as discussed above in connection with FIG. 3A). Patterns 324a-324c may be printed on top of pattern 322 using invisible ink that may be invisible to the human eye. Each of patterns 324a-324c may be printed using a different invisible ink, with each invisible ink detectable using a different wavelength range.

Using invisible ink to print a pattern over visible ink may make it more difficult for a malicious actor to detect the invisible ink. For example, invisible ink might show up as visual artifacts (e.g., anomalies apparent during visual representation such as in digital graphics) on a photocopy of the token when the token is scanned using a photocopier or other scanning device. In contrast, if the invisible ink is printed over the visible ink (e.g., black or dark-colored ink), the visible ink portion may show up on the photocopy of the token and the invisible ink may leave no visual artifacts because it overlaps with the visible ink. Thus, using invisible ink that overlaps with visible ink may make it more difficult for a malicious actor to create a fake token.

In some embodiments, the text of the token may include a location corresponding to the steganographic image that contains the second code. For example, the text of the token may include a coordinate (e.g., 1 inch from the left and 2 inches from the top) indicating the location of the steganographic image. In some embodiments, the authentication system 102 may retrieve the location of the steganographic image from a chip stored on the token (e.g., a chip stored on a credit card). The location information on the chip may be encrypted using the secret key that was used to generate a message authentication code (e.g., the first code).

The authentication system 102 may use patterns detected or extracted from the token (e.g., as discussed above in connection with FIGS. 3A-3C) to generate the second code. For example, the authentication system 102 may concatenate values extracted from each pattern to form the second code. The authentication system 102 may determine an order in which to concatenate each portion of the second code. The order may be determined based on the current time. For example, if the current time is past an expiration date of the token, the authentication system 102 may concatenate the portions of the second code such that the order is not correct. This may prevent the expired token from being authenticated by the authentication system 102. If the current time indicates that the token has not expired, the authentication system may concatenate the portions of the second code such that the order is correct (e.g., a second portion of the code may be appended to the end of a first portion of the code).

In some embodiments, the ordering of each portion may be determined based on an application code received from a user device (e.g., user device 104) associated with the token. The application code may be a sequence of numbers or letters. The authentication system 102 (e.g., via the communication subsystem 112) may receive a code from a user device associated with the document. The code may be received, for example, after the token has been presented to the authentication system 102. For example, an application executing on a mobile device of the user may send a code to the authentication system 102. The authentication system 102 may verify that the code is correct. In response to verifying the code, the authentication system 102 may use the correct ordering (e.g., ordering the first portion prior to the second portion) to enable the token to pass authentication.

Through the use of a code received from the user device, the authentication system 102 may be able to verify that the token is authentic. For example, if the token is a cashier's check, the data used to create the cashier's check may be stored in the application of the user device 104 or on a server. The user device 104 or server may generate a code indicating the correct information for the token (e.g., the correct payment amount, payee, payor, etc.). The authentication system 102 may compare the code with the text of the token to verify that the text is correct. If an incorrect code or no code is received, the authentication system 102 may fail to authenticate the token.

The authentication system 102 may use the authentication subsystem 116 to compare the first code with the second code. If the first code and the second code match, the authentication subsystem 14 may determine that the text of the token has not been changed by a malicious actor and may authenticate the token. If the second token does not match the first token, the authentication subsystem 116 may determine that the token is not authentic. In response to determining that the token is not authentic, the authentication system 102 may prevent the token from being processed. For example, the authentication system 102 may prevent a credit card from being used, a cashier's check from being processed, etc.

The user device 104 may be any computing device, including, but not limited to, a laptop computer, a tablet computer, a hand-held computer, smartphone, other computer equipment (e.g., a server or virtual server), including "smart," wireless, wearable, or mobile devices.

The authentication system 102 may include one or more computing devices described above or may include any type of mobile terminal, fixed terminal, or other device. For example, the authentication system 102 may be implemented as a cloud-computing system and may feature one or more component devices. A person skilled in the art would understand that system 100 is not limited to the devices shown in FIG. 1. Users may, for example, utilize one or more other devices to interact with devices, one or more servers, or other components of system 100. A person skilled in the art would also understand that while one or more operations are described herein as being performed by particular components of the system 100, those operations may, in some embodiments, be performed by other components of the system 100. As an example, while one or more operations are described herein as being performed by components of the authentication system 102, those operations may be performed by components of the user device 104, or database 106. In some embodiments, the various computers and systems described herein may include one or more computing devices that are programmed to perform the described functions.

One or more components of the authentication system 102, user device 104, or database 106, may receive content or data via input/output (I/O) paths. The one or more components of the authentication system 102, the user device 104, or the database 106 may include processors or control circuitry to send and receive commands, requests, and other suitable data using the I/O paths. The control circuitry may include any suitable processing, storage, or I/O circuitry. Each of these devices may include a user input interface or user output interface (e.g., a display) for use in receiving and displaying data. It should be noted that in some embodiments, the authentication system 102, the user device 104, or the database 106 may have neither user input interfaces nor displays and may instead receive and display content using another device (e.g., a dedicated display device such as a computer screen or a dedicated input device such as a remote control, mouse, voice input, etc.).

One or more components or devices in the system 100 may include electronic storages. The electronic storages may include non-transitory storage media that electronically stores information. The electronic storage media of the electronic storages may include one or both of (a) system storage that is provided integrally (e.g., substantially non-removable) with servers or client devices, or (b) removable storage that is removably connectable to the servers or client devices via, for example, a port (e.g., a universal serial bus (USB) port, a firewire port, etc.) or a drive (e.g., a disk drive, etc.). The electronic storages may include one or more of optically readable storage media (e.g., optical discs, etc.), magnetically readable storage media (e.g., magnetic tape, magnetic hard drive, floppy drive, etc.), electrical charge-based storage media (e.g., EEPROM, random access memory (RAM), etc.), solid-state storage media (e.g., flash drive, etc.), or other electronically readable storage media. The electronic storages may include one or more virtual storage resources (e.g., cloud storage, a virtual private network, or other virtual storage resources). The electronic storages may store software algorithms, information determined by the processors, information obtained from servers, information obtained from client devices, or other information that enables the functionality as described herein.

FIG. 1 also includes a network 150. The network 150 may be the Internet, a mobile phone network, a mobile voice or data network (e.g., a fifth generation (5G) or Long-Term Evolution (LTE) network), a cable network, a satellite network, a combination of these networks, or other types of communications networks or combinations of communications networks. The devices in FIG. 1 (e.g., authentication system 102, the user device 104, or the database 106) may communicate (e.g., with each other or other computing systems not shown in FIG. 1) via the network 150 using one or more communications paths, such as a satellite path, a fiber-optic path, a cable path, a path that supports Internet communications (e.g., IPTV), free-space connections (e.g., for broadcast or other wireless signals), or any other suitable wired or wireless communications path or combination of such paths. The devices in FIG. 1 may include additional communication paths linking hardware, software, or firmware components operating together. For example, the authentication system 102, any component of the processing system (e.g., the communication subsystem 112, the sensor subsystem 114, or the authentication subsystem 116), the user device 104, or the database 106 may be implemented by one or more computing platforms.

Figure 4A:
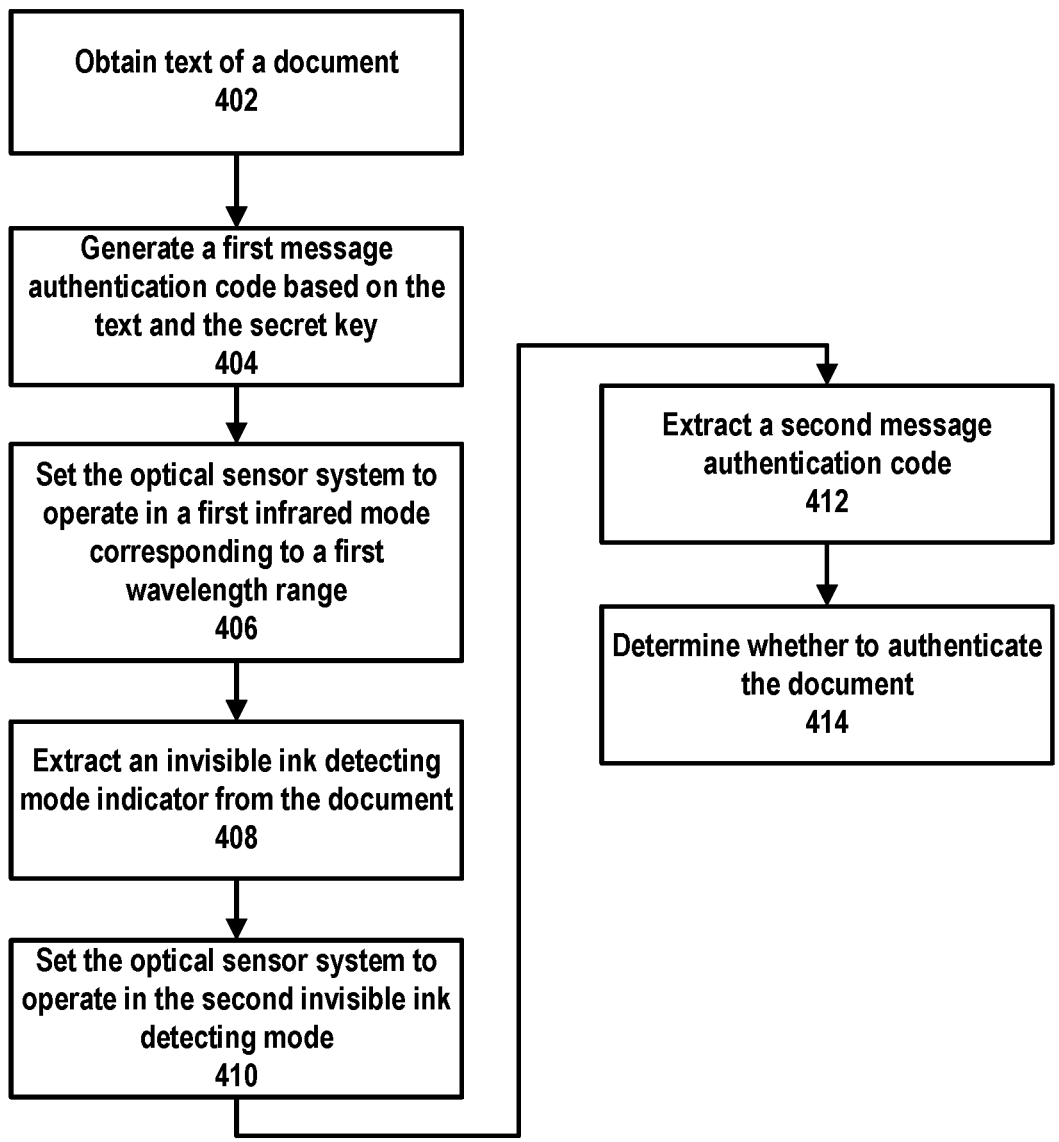
FIG. 4A shows an example flowchart of the actions involved in using infrared ink for token authentication, in accordance with some embodiments.
Figure 4B:
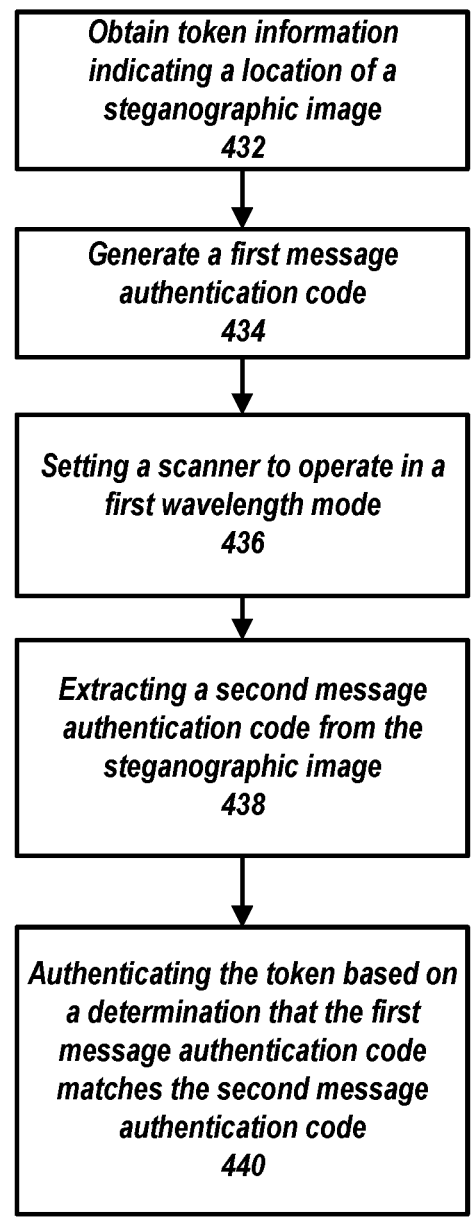
FIG. 4B shows an example flowchart of the actions involved in using a steganographic image to authenticate a token, in accordance with some embodiments.
Figure 4C:
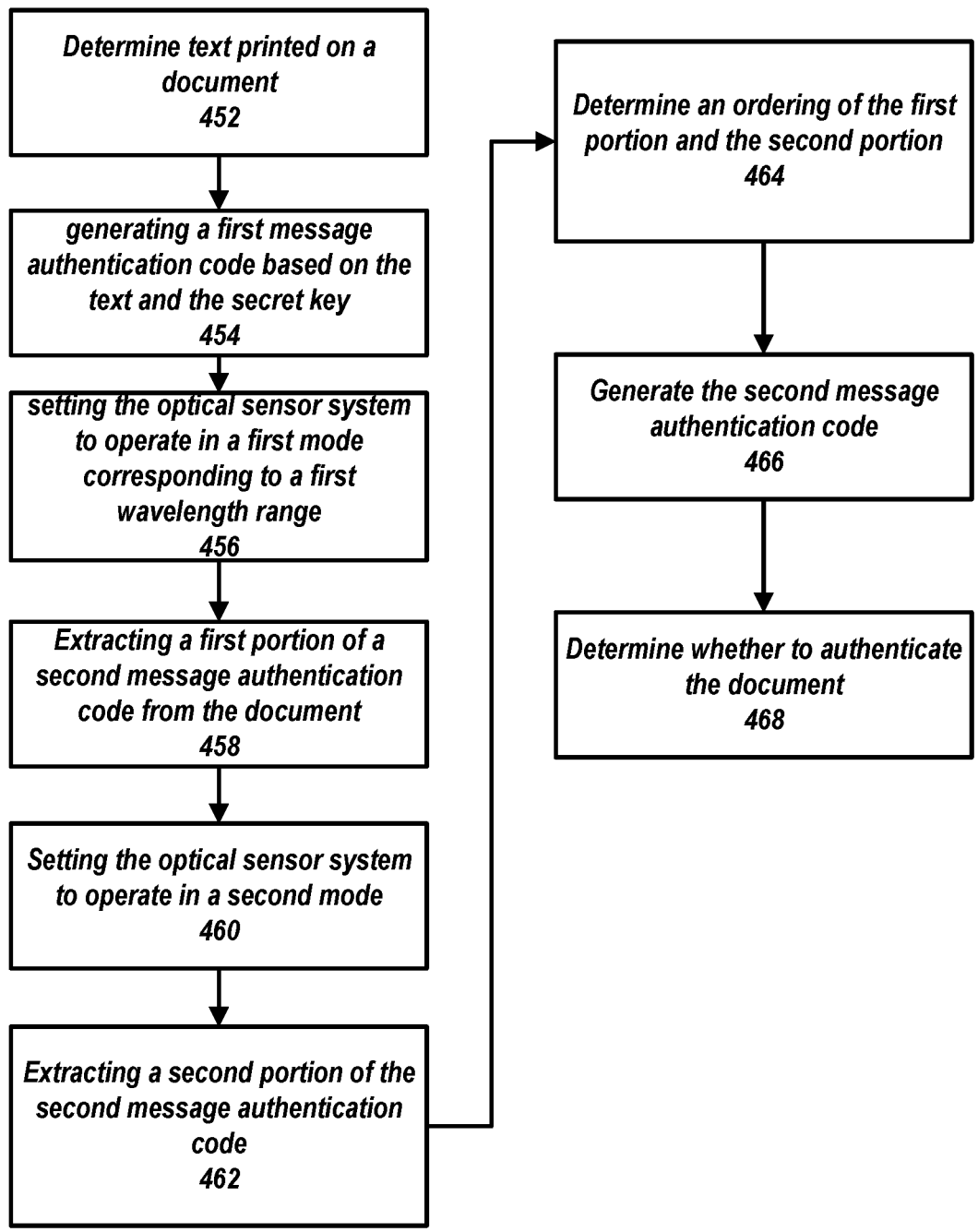
FIG. 4C shows an example flowchart of the actions involved in using multidimensional encoding for authentication, in accordance with some embodiments.

FIGS. 4A-4C are example flowcharts of processing operations of methods that enable the various features and functionality of the systems as described in detail above. The processing operations of each method presented below are intended to be illustrative and non-limiting. In some embodiments, for example, the methods may be accomplished with one or more additional operations not described, or without one or more of the operations discussed. Additionally, the order in which the processing operations of the methods are illustrated (and described below) is not intended to be limiting.

Figure 5:
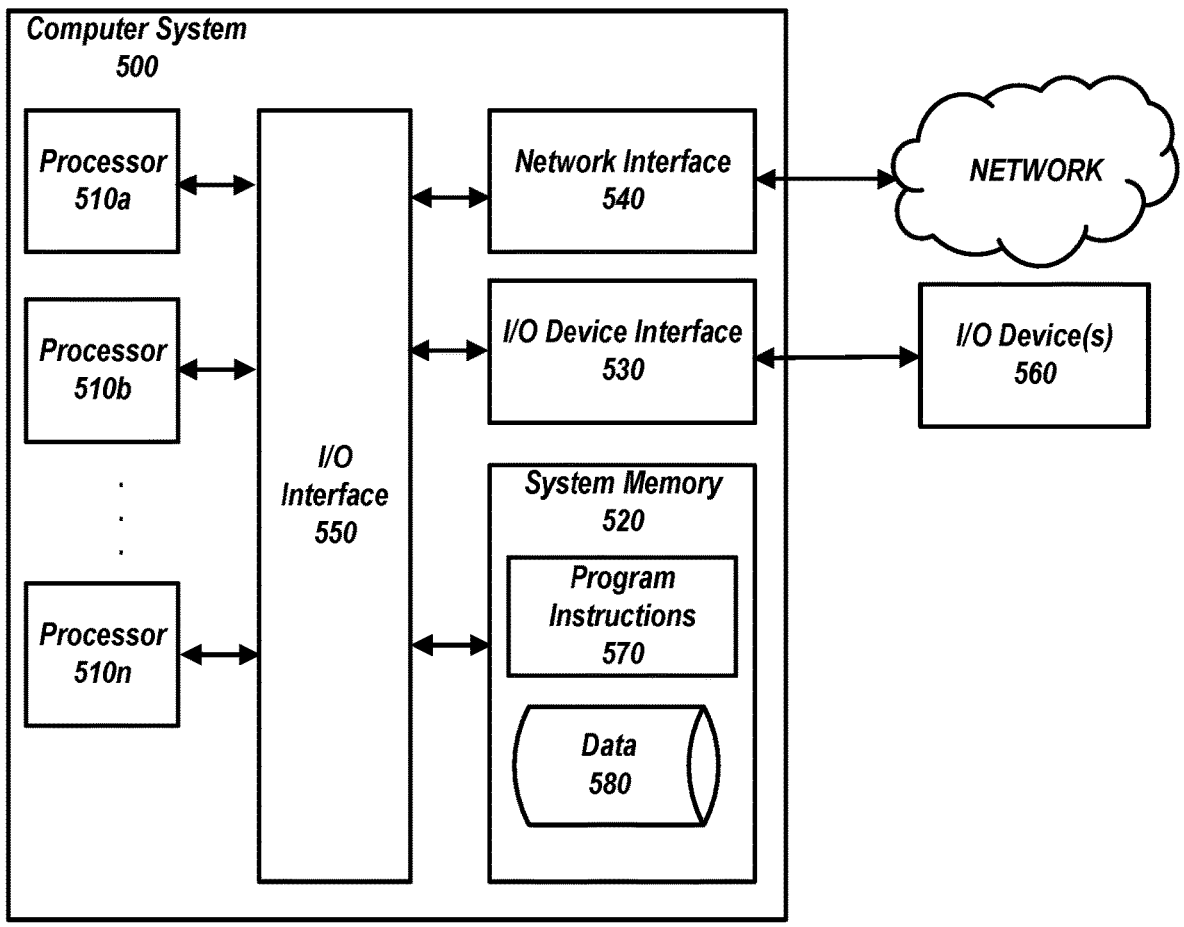
FIG. 5 shows an example computing system that may be used in accordance with some embodiments.

In some embodiments, the methods may be implemented in one or more processing devices (e.g., a digital processor, an analog processor, a digital circuit designed to process information, an analog circuit designed to process information, a state machine, or other mechanisms for electronically processing information). The processing devices may include one or more devices executing some or all of the operations of the methods in response to instructions stored electronically on an electronic storage medium. The processing devices may include one or more devices configured through hardware, firmware, or software to be specifically designed for execution of one or more of the operations of the methods. It should be noted that, in some embodiments, the operations performed by authentication system 102 may be performed using one or more components in system 100 (FIG. 1) or computer system 500 (FIG. 5).

FIG. 4A shows an example flowchart of the actions involved in using invisible ink for token authentication. For example, process 400 may represent the actions taken by one or more devices shown in FIGS. 1-3 and described above. At 402, authentication system 102 may obtain text of a document. For example, the document may include a credit card, a check (e.g., a cashier's check), a web page, or other documents. The text may include name, account identifier, check amount, payee, payer, or other information associated with documents.

At 404, authentication system 102 may generate a first authentication code based on the text and a secret key. For example, the text may be used with the secret key to generate a message authentication code (e.g., a hash-based message authentication code). The message authentication code may be used to determine whether any of the text of the document has been altered.

At 406, authentication system 102 may set the sensor subsystem 114 to operate in a first mode corresponding to a first wavelength range. The sensor subsystem 114 may be set to a mode that enables it to scan and detect invisible ink (e.g., ink that is invisible to the naked eye). For example, the sensor subsystem 114 may be set to a mode that enables it to scan documents with light that has a wavelength of around 840 nanometers.

At 408, authentication system 102 may extract an invisible ink detecting mode indicator from the document. The authentication system 102 may scan the document using the first mode and may detect the invisible ink detecting mode indicator (e.g., a code) that is printed on the document (e.g., printed in infrared ink that is otherwise invisible to the human eye). The indicator may indicate a second mode to use to scan the document. The indicator may indicate that scanning the document using the second mode may reveal a second message authentication code. The second message authentication code may have been printed on the document (e.g., when the document was created) and may have been generated using the document's original text. By comparing the first message authentication code with the second message authentication code, the authentication system 102 may be able to determine whether any portion of the text was altered or whether the document has been forged.

At 410, authentication system 102 may set the sensor subsystem 114 to operate in the second mode. For example, using the second mode may cause the sensor subsystem 114 to scan the document using a wavelength of light that is around 885 nanometers. The second mode may allow the authentication system 102 to detect a second message authentication code on the document.

At 412, authentication system 102 may extract the second message authentication code from the document. For example, the authentication system 102 may scan the document using the second mode to determine the second message authentication code.

At 414, authentication system 102 may determine whether to authenticate the document. For example, the authentication system 102 may compare the first message authentication code with the second message authentication code. If the first message authentication code matches the second message authentication code, then the authentication system 102 may determine to authenticate the document (e.g., the document has not been forged). Alternatively, if the first message authentication code does not match the second message authentication code, then the authentication system 102 may not authenticate the document (e.g., the document may be considered fraudulent or forged).

FIG. 4B shows an example flowchart of the actions involved in using steganographic images to authenticate a token. For example, process 430 may represent the actions taken by one or more devices shown in FIGS. 1-3 and described above. At 432, authentication system 102 may obtain token information indicating a location of a steganographic image. For example, authentication system 102 may use the sensor subsystem 114 (e.g., a chip reader of the sensor subsystem 114) to obtain an identification number and expiration date of a credit card. The token information may include a location of a steganographic image among a plurality of steganographic images (e.g., that are printed in infrared ink on the token).

At 434, authentication system 102 may generate a first authentication code based on the token information and a secret key. For example, the text may be used with the secret key to generate a message authentication code (e.g., a hash-based message authentication code). The message authentication code may be used to determine whether any of the information (e.g., printed on the token) has been altered or whether the token is a forgery.

At 436, authentication system 102 may set the sensor subsystem 114 to operate in a first infrared mode corresponding to a first wavelength range. The sensor subsystem 114 may be set to a mode that enables it to scan and detect invisible ink (e.g., ink that is invisible to the naked eye). For example, the sensor subsystem 114 may be set to a mode that enables it to scan documents with light that has a wavelength of around 840 nanometers. The sensor subsystem 114 may be able to detect a steganographic image on the token by operating in the first infrared mode and scanning the token.

At 438, authentication system 102 may extract a second message authentication code from the steganographic image. For example, the authentication system 102 may read the token using the first infrared mode and may detect a steganographic image on the token. The second message authentication code may have been added to or printed on the token and may have been generated using the token's original information. By comparing the first message authentication code with the second message authentication code, the authentication system 102 may be able to determine whether any portion of the token information was altered or whether the document has been forged.

At 440, authentication system 102 may determine whether to authenticate the document. For example, the authentication system 102 may compare the first message authentication code with the second message authentication code. If the first message authentication code matches the second message authentication code, then the authentication system 102 may determine to authenticate the document (e.g., the document has not been forged). Alternatively, if the first message authentication code does not match the second message authentication code, then the authentication system 102 may not authenticate the document (e.g., the document may be considered fraudulent or forged).

FIG. 4C shows an example flowchart of the actions involved in using multidimensional encoding for token authentication. For example, process 450 may represent the actions taken by one or more devices shown in FIGS. 1-3 and described above. At 452, authentication system 102 may obtain text of a document. For example, the document may include a credit card, a check (e.g., a cashier's check), a web page, or other documents. The text may include name, account identifier, check amount, payee, payer, or other information associated with documents.

At 454, authentication system 102 may generate a first authentication code based on the text and a secret key. For example, the text may be used with the secret key to generate a message authentication code (e.g., a hash-based message authentication code). The message authentication code may be used to determine whether the text of the document has been altered.

At 456, authentication system 102 may set the sensor subsystem 114 to operate in a first infrared mode corresponding to a first wavelength range. The sensor subsystem 114 may be set to a mode that enables it to scan and detect invisible ink (e.g., ink that is invisible to the naked eye). For example, the sensor subsystem 114 may be set to a mode that enables it to scan documents with light that has a wavelength of around 840 nanometers.

At 458, authentication system 102 may extract a first portion of a second code (e.g., a second message authentication code) from the document. The authentication system 102 may scan the document using the first infrared mode and may detect a first portion of the code that is printed on the document (e.g., printed in infrared ink that is otherwise invisible to the human eye). The first portion of the code may be used to generate a second authentication code. The second code may have been generated using the document's original text, for example, as a message authentication code. By comparing the first message authentication code with the second message authentication code, the authentication system 102 may be able to determine whether any portion of the text of the document was altered or whether the document has been forged.

At 460, authentication system 102 may set the sensor subsystem 114 to operate in a second infrared mode. For example, using the second infrared mode may allow the sensor subsystem 114 to scan the document using a wavelength of light that is around 885 nanometers. The second infrared mode may allow the authentication system 102 to detect a second portion of the second code on the document.

At 462, authentication system 102 may extract a second portion of the second message authentication code from the document. For example, the authentication system 102 may scan the document using the second infrared mode to determine the second portion of the second message authentication code.

At 464, authentication system 102 may determine an ordering of the first portion and the second portion of the second message authentication code. The ordering may be used to generate the second message authentication code. One ordering (e.g., the first portion as first and the second portion as second in the order) may lead to the second message authentication code being generated correctly while another ordering (e.g., the first portion as second and the second portion as first in the order) may cause the second message authentication code to be generated incorrectly. An incorrect second message authentication code may cause the authentication system 102 to fail to authenticate the document or reject any actions that a user may wish to perform using the document (e.g., making a deposit, making a payment, etc.). The order may be based on a date of the document or a current time. For example, the authentication system 102 may determine to use an incorrect ordering if the document is expired.

At 468, authentication system 102 may determine whether to authenticate the document. For example, the authentication system 102 may compare the first message authentication code with the second message authentication code. The authentication system 102 may determine to authenticate the document (e.g., the document has not been forged), for example, if the first message authentication code matches the second message authentication code. Alternatively, the authentication system 102 may not authenticate the document (e.g., the document may be considered fraudulent or forged) if, for example, the first message authentication code does not match the second message authentication code.

It is contemplated that the actions or descriptions of FIGS. 4A-4C may be used with any other embodiment of this disclosure. In addition, the actions and descriptions described in relation to FIG. 4A-4C may be done in alternative orders or in parallel to further the purposes of this disclosure. For example, each of these actions may be performed in any order, in parallel, or simultaneously to reduce lag or increase the speed of the system or method. Furthermore, it should be noted that any of the devices or equipment discussed in relation to FIGS. 1-3 could be used to perform one or more of the actions in FIGS. 4A-4C.

FIG. 5 is a diagram that illustrates an exemplary computing system 500 in accordance with embodiments of the present technique. Various portions of systems and methods described herein may include or be executed on one or more computer systems similar to computing system 500. Further, processes and modules described herein may be executed by one or more processing systems similar to that of computing system 500.

Computing system 500 may include one or more processors (e.g., processors 510*a*-510*n*) coupled to system memory 520, an I/O device interface 530, and a network interface 540 via an I/O interface 550. A processor may include a single processor or a plurality of processors (e.g., distributed processors). A processor may be any suitable processor capable of executing or otherwise performing instructions. A processor may include a central processing unit (CPU) that carries out program instructions to perform the arithmetical, logical, and I/O operations of computing system 500. A processor may execute code (e.g., processor firmware, a protocol stack, a database management system, an operating system, or a combination thereof) that creates an execution environment for program instructions. A processor may include a programmable processor. A processor may include general or special purpose microprocessors. A processor may receive instructions and data from a memory (e.g., system memory 520). Computing system 500 may be a units-processor system including one processor (e.g., processor 510a), or a multi-processor system including any number of suitable processors (e.g., 510a-510n). Multiple processors may be employed to provide for parallel or sequential execution of one or more portions of the techniques described herein. Processes, such as logic flows, described herein may be performed by one or more programmable processors executing one or more computer programs to perform functions by operating on input data and generating corresponding output. Processes described herein may be performed by, and apparatuses can also be implemented as, special purpose logic circuitry (e.g., an FPGA (field-programmable gate array) or an ASIC (application-specific integrated circuit)). Computing system 500 may include a plurality of computing devices (e.g., distributed computer systems) to implement various processing functions.

I/O device interface 530 may provide an interface for connection of one or more I/O devices 560 to computer system 500. I/O devices may include devices that receive input (e.g., from a user) or output information (e.g., to a user). I/O devices 560 may include, for example, graphical user interface presented on displays (e.g., a cathode ray tube (CRT) or liquid crystal display (LCD) monitor), pointing devices (e.g., a computer mouse or trackball), keyboards, keypads, touchpads, scanning devices, voice recognition devices, gesture recognition devices, printers, audio speakers, microphones, cameras, or the like. I/O devices 560 may be connected to computer system 500 through a wired or wireless connection. I/O devices 560 may be connected to computer system 500 from a remote location. I/O devices 560 located on a remote computer system, for example, may be connected to computer system 500 via a network and network interface 540.

Network interface 540 may include a network adapter that provides for connection of computer system 500 to a network. Network interface 540 may facilitate data exchange between computer system 500 and other devices connected to the network. Network interface 540 may support wired or wireless communication. The network may include an electronic communication network, such as the Internet, a local area network (LAN), a wide area network (WAN), a cellular communications network, or the like.

System memory 520 may be configured to store program instructions 570 or data 580. Program instructions 570 may be executable by a processor (e.g., one or more of processors 510a-510n) to implement one or more embodiments of the present techniques. Instructions 570 may include modules of computer program instructions for implementing one or more techniques described herein with regard to various processing modules. Program instructions may include a computer program (which in certain forms is known as a program, software, software application, script, or code). A computer program may be written in a programming language, including compiled or interpreted languages, or declarative or procedural languages. A computer program may include a unit suitable for use in a computing environment, including as a stand-alone program, a module, a component, or a subroutine. A computer program may or may not correspond to a file in a file system. A program may be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program may be deployed to be executed on one or more computer processors located locally at one site or distributed across multiple remote sites and interconnected by a communication network.

System memory 520 may include a tangible program carrier having program instructions stored thereon. A tangible program carrier may include a non-transitory computer-readable storage medium. A non-transitory computer-readable storage medium may include a machine-readable storage device, a machine-readable storage substrate, a memory device, or any combination thereof. A non-transitory computer-readable storage medium may include non-volatile memory (e.g., flash memory, ROM, PROM, EPROM, EEPROM memory), volatile memory (e.g., RAM, static random access memory (SRAM), synchronous dynamic RAM (SDRAM)), bulk storage memory (e.g., CD-ROM or DVD-ROM, hard-drives), or the like. System memory 520 may include a non-transitory computer-readable storage medium that may have program instructions stored thereon that are executable by a computer processor (e.g., one or more of processors 510a-510n) to cause the subject matter and the functional operations described herein. A memory (e.g., system memory 520) may include a single memory device or a plurality of memory devices (e.g., distributed memory devices).

I/O interface 550 may be configured to coordinate I/O traffic between processors 510a-510n, system memory 520, network interface 540, I/O devices 560, or other peripheral devices. I/O interface 550 may perform protocol, timing, or other data transformations to convert data signals from one component (e.g., system memory 520) into a format suitable for use by another component (e.g., processors 510a-510n). I/O interface 550 may include support for devices attached through various types of peripheral buses, such as a variant of the peripheral component interconnect (PCI) bus standard or the USB standard.

Embodiments of the techniques described herein may be implemented using a single instance of computer system 500 or multiple computer systems 500 configured to host different portions or instances of embodiments. Multiple computer systems 500 may provide for parallel or sequential processing/execution of one or more portions of the techniques described herein.

Those skilled in the art will appreciate that computer system 500 is merely illustrative and is not intended to limit the scope of the techniques described herein. Computer system 500 may include any combination of devices or software that may perform or otherwise provide for the performance of the techniques described herein. For example, computer system 500 may include or be a combination of a cloud-computing system, a data center, a server rack, a server, a virtual server, a desktop computer, a laptop computer, a tablet computer, a server device, a client device, a mobile telephone, a personal digital assistant (PDA), a mobile audio or video player, a game console, a vehicle-mounted computer, or a global positioning system (GPS), or the like. Computer system 500 may also be connected to other devices that are not illustrated or may operate as a stand-alone system. In addition, the functionality provided by the illustrated components may in some embodiments be combined in fewer components or distributed in additional components. Similarly, in some embodiments, the functionality of some of the illustrated components may not be provided or other additional functionality may be available.

Those skilled in the art will also appreciate that while various items are illustrated as being stored in memory or on storage while being used, these items or portions of them may be transferred between memory and other storage devices for purposes of memory management and data integrity. In some embodiments, some or all of the software components may execute in memory on another device and communicate with the illustrated computer system via inter-computer communication. Some or all of the system components or data structures may also be stored (e.g., as instructions or structured data) on a computer-accessible medium or a portable article to be read by an appropriate drive, various examples of which are described above. In some embodiments, instructions stored on a computer-accessible medium separate from computer system 500 may be transmitted to computer system 500 via transmission media or signals such as electrical, electromagnetic, or digital signals, conveyed via a communication medium such as a network or a wireless link. Various embodiments may further include receiving, sending, or storing instructions or data implemented in accordance with the foregoing description upon a computer-accessible medium. Accordingly, the present disclosure may be practiced with other computer system configurations.

In block diagrams, illustrated components are depicted as discrete functional blocks, but embodiments are not limited to systems in which the functionality described herein is organized as illustrated. The functionality provided by each of the components may be provided by software or hardware modules that are organized differently than is presently depicted, for example, such software or hardware may be intermingled, conjoined, replicated, broken up, distributed (e.g., within a data center or geographically), or otherwise differently organized. The functionality described herein may be provided by one or more processors of one or more computers executing code stored on a tangible, non-transitory, machine-readable medium. In some cases, third-party content delivery networks may host some or all of the information conveyed over networks, in which case, to the extent information (e.g., content) is said to be supplied or otherwise provided, the information may be provided by sending instructions to retrieve that information from a content delivery network.

It should be understood that the description and the drawings are not intended to limit the disclosure to the particular form disclosed, but to the contrary, the intention is to cover all modifications, equivalents, and alternatives falling within the spirit and scope of the present disclosure as defined by the appended claims. Further modifications and alternative embodiments of various aspects of the disclosure will be apparent to those skilled in the art in view of this description. Accordingly, this description and the drawings are to be construed as illustrative only and are for the purpose of teaching those skilled in the art the general manner of carrying out the disclosure. It is to be understood that the forms of the disclosure shown and described herein are to be taken as examples of embodiments. Elements and materials may be substituted for those illustrated and described herein, parts and processes may be reversed or omitted, and certain features of the disclosure may be utilized independently, all as would be apparent to one skilled in the art after having the benefit of this description of the disclosure. Changes may be made in the elements described herein without departing from the spirit and scope of the disclosure as described in the following claims.

Headings used herein are for organizational purposes only and are not meant to be used to limit the scope of the description.

As used throughout this application, the word "may" is used in a permissive sense (i.e., meaning having the potential to), rather than the mandatory sense (i.e., meaning must). The words "include," "including," "includes," and the like mean including, but not limited to. As used throughout this application, the singular forms "a," "an," and "the" include plural referents unless the content explicitly indicates otherwise. Thus, for example, reference to "an element" or "the element" includes a combination of two or more elements, notwithstanding use of other terms and phrases for one or more elements, such as "one or more." The term "or" is, unless indicated otherwise, non-exclusive (i.e., encompassing both "and" and "or"). Terms describing conditional relationships, for example, "in response to X, Y," "upon X, Y," "if X, Y," "when X, Y," and the like, encompass causal relationships in which the antecedent is a necessary causal condition, the antecedent is a sufficient causal condition, or the antecedent is a contributory causal condition of the consequent, for example, "state X occurs upon condition Y obtaining" is generic to "X occurs solely upon Y" and "X occurs upon Y and Z." Such conditional relationships are not limited to consequences that instantly follow the antecedent obtaining, as some consequences may be delayed, and in conditional statements, antecedents are connected to their consequents, e.g., the antecedent is relevant to the likelihood of the consequent occurring. Statements in which a plurality of attributes or functions are mapped to a plurality of objects (e.g., one or more processors performing actions A, B, C, and D) encompasses both all such attributes or functions being mapped to all such objects and subsets of the attributes or functions being mapped to subsets of the attributes or functions (e.g., both or all processors each performing actions A-D, and a case in which processor 1 performs action A, processor 2 performs action B and part of action C, and processor 3 performs part of action C and action D), unless otherwise indicated. Further, unless otherwise indicated, statements that one value or action is "based on" another condition or value encompass both instances in which the condition or value is the sole factor and instances in which the condition or value is one factor among a plurality of factors. The term "each" is not limited to "each and every" unless indicated otherwise. Unless specifically stated otherwise, as apparent from the discussion, it is appreciated that throughout this specification, discussions utilizing terms such as "processing," "computing," "calculating," "determining," or the like refer to actions or processes of a specific apparatus, such as a special purpose computer or a similar special purpose electronic processing/computing device.

The above-described embodiments of the present disclosure are presented for purposes of illustration and not of limitation, and the present disclosure is limited only by the claims which follow. Furthermore, it should be noted that the features and limitations described in any one embodiment may be applied to any other embodiment herein, and flowcharts or examples relating to one embodiment may be combined with any other embodiment in a suitable manner, done in different orders, or done in parallel. In addition, the systems and methods described herein may be performed in real time. It should also be noted that the systems or methods described above may be applied to, or used in accordance with, other systems or methods.

The present techniques will be better understood with reference to the following enumerated embodiments:

1. A method comprising: determining text on a document, the text comprising a first text portion and a second text portion; generating a first message authentication code based on the first text portion and a cryptographic key; determining, based on the second text portion, a first wavelength range of a light spectrum to use to scan the document; extracting, via one or more sensors a wavelength indicator from a first coded image printed on the document; determining the second wavelength range to use to scan the document; extracting a second message authentication code from a second coded image printed on the document; and authenticating the document based on a determination that the first message authentication code matches the second message authentication code.

2. The method of any of the previous embodiments, wherein determining, based on the second text portion, a first wavelength range comprises: determining, based on the text, an expiration date of the document; and determining, based on the expiration date, the first wavelength range.

3. The method of any of the previous embodiments, wherein determining a first wavelength range comprises: generating, based on the text, a cryptographic hash; and in response to determining that the cryptographic hash is greater than a threshold value, selecting the first wavelength range from a plurality of wavelength ranges.

4. The method of any of the previous embodiments, wherein the cryptographic key comprises a first public key of a key pair, the method further comprising: determining a third-party certificate on the document; and determining, via a second public key corresponding to the third-party, that the third-party certificate is valid.

5. The method of any of the previous embodiments, wherein the wavelength indicator comprises a first invisible-ink-printed pattern, and wherein the second message authentication code comprises a second invisible-ink-printed pattern that overlaps with the first invisible-ink-printed pattern.

6. The method of any of the previous embodiments, wherein extracting the second message authentication code comprises: determining, via the one or more sensors, a plurality of steganographic images; generating, based on the text, a cryptographic hash; in response to determining that the cryptographic hash is less than a threshold value, selecting a first steganographic image of the plurality of steganographic images; and extracting the second message authentication code from the first steganographic image.

7. The method of any of the previous embodiments, wherein determining a first wavelength range comprises: retrieving a data structure comprising a plurality of wavelengths and a plurality of dates, wherein each date of the plurality of dates is mapped to a wavelength of the plurality of wavelengths; and determining, based on the data structure and the date, the first wavelength range.

8. The method of any of the previous embodiments, wherein generating the first message authentication code comprises: generating concatenated text by concatenating the text with the cryptographic key; and inputting the concatenated text into a cryptographic hash function.

9. A method comprising: determining, via one or more sensors, text on a document and location information associated with a steganographic image on the document; generating a first message authentication code based on the text and a secret key; and determining a first wavelength range to use to scan the document; extracting a second message authentication code from the steganographic image; and authenticating the document based on a determination that the first message authentication code corresponds to the second message authentication code.

10. The method of embodiment 9, wherein extracting a second message authentication code comprises: determining, based on the steganographic image, second text; generating concatenated text by concatenating the second text with the secret key; and inputting the concatenated text into a cryptographic hash function.

11. The method of any of embodiments 9-10, wherein determining a steganographic image comprises: generating, based on the text, a cryptographic hash; and in response to determining that the cryptographic hash is less than a threshold value, selecting the steganographic image at a first location of the document.

12. The method of any of embodiments 9-11, wherein determining a first wavelength range comprises: determining, based on the text, an expiration date of the document; retrieving, from a database, a data structure associated with the expiration date, wherein the data structure maps the expiration date to the first wavelength range; and determining, based on the data structure, the first wavelength range.

13. The method of any of embodiments 9-12, wherein determining a first steganographic image comprises: determining, based on the location information, a coordinate corresponding to a location on the document; and retrieving a steganographic image of the plurality of steganographic images that corresponds to the location.

14. The method of any of embodiments 9-13, wherein the first message authentication code is further generated based on the location information, and wherein generating the second message authentication code comprises generating, based on the location information, the second message authentication code.

15. The method of any of embodiments 9-14, wherein determining location information associated with a steganographic image comprises: accessing data stored on a chip located on the document; decrypting the data using the secret key; and extracting the location information from the data.

16. The method of any of embodiments 9-15, wherein determining a first wavelength range comprises: generating, based on the text, a cryptographic hash; and in response to determining that the cryptographic hash is greater than a threshold value, selecting the first wavelength range from a plurality of wavelength ranges.

17. The method of any of embodiments 9-16, wherein the wavelength indicator comprises a first invisible-ink-printed pattern, and wherein the second message authentication code comprises a second invisible-ink-printed pattern that overlaps with the first invisible-ink-printed pattern.

18. A method comprising: determining text printed on a document; generating a first message authentication code based on the text and a secret key; obtaining a second message authentication code by: extracting first data related to a second authentication code from a first invisible-ink-printed pattern on the document; extracting, second data related to the second message authentication code from a second invisible-ink-printed pattern that overlaps with the first invisible-ink-printed pattern on the document; generating, based on the first data and the second data, the second message authentication code; and authenticating the document based on a determination that the first message authentication code matches the second message authentication code.

19. The method of embodiment 18, wherein the first wavelength range and the second wavelength range do not overlap.

20. The method of any of embodiments 18-19, further comprising: generating, based on the text printed on the document, a cryptographic hash; and in response to determining that the cryptographic hash is greater than a threshold value, determining the first wavelength range from a plurality of wavelength ranges.

21. The method of any of embodiments 18-20, wherein the secret key comprises a public key of a key pair, the method further comprising: determining a third-party certificate on the document; determining, via a public key corresponding to a third-party associated with the third-party certificate, that the third-party certificate is valid; and in response to determining that the third-party certificate is valid, determining that the secret key is valid.

22. The method of any of embodiments 17-21, further comprising: extracting third data related to the second message authentication code from a third ink pattern on the document, wherein the third ink pattern is printed using ink visible in light that has a wavelength between 380 and 700 nanometers.

23. The method of any of embodiments 17-22, wherein the third ink pattern overlaps with the second invisible-ink-printed pattern and the first invisible-ink-printed pattern on the document.

24. The method of any of embodiments 17-23, wherein determining an ordering of the first data and the second data comprises: receiving a code from a user device associated with the document; verifying that the code is correct; and in response to verifying the code, ordering the first portion prior to the second data.

25. The method of any of embodiments 17-24, wherein determining an ordering of the first data and the second data comprises: determining, based on a date printed on the document, that the document has not expired; and in response to determining that the document has not expired, ordering the first data prior to the second data.

26. The method of any of embodiments 17-25, wherein the first invisible-ink-printed pattern is hidden in a steganographic image.

27. A tangible, non-transitory, machine-readable medium storing instructions that, when executed by a data processing apparatus, cause the data processing apparatus to perform operations comprising those of any of embodiments 1-26.

28. A system comprising: one or more processors; and memory storing instructions that, when executed by the processors, cause the processors to effectuate operations comprising those of any of embodiments 1-26.

29. A system comprising means for performing any of embodiments 1-26.

What is claimed is:

1. A system for employing multiple optical sensor modes to perform token authentication, the system comprising:
storage circuitry configured to store a secret key;
an optical sensor system configured to operate in a plurality of wavelengths, the plurality of wavelengths comprising a first invisible mode corresponding to a first wavelength range within a first invisible light spectrum and a second invisible mode corresponding to a second wavelength range within a second invisible light spectrum different from the first wavelength range; and
control circuitry configured to perform operations comprising:
obtaining text printed on a document, wherein the text comprises a date printed on the document;
generating a first message authentication code based on the text and the secret key;
obtaining a second message authentication code by:
setting, based on the date printed on the document, the optical sensor system to operate in the first invisible mode corresponding to the first wavelength range;
extracting, via the optical sensor system in the first invisible mode, an invisible mode indicator from invisible ink printed on the document, wherein the invisible mode indicator indicates the second wavelength range;
setting, based on the invisible mode indicator extracted via the first invisible mode, the optical sensor system to operate in the second invisible mode corresponding to the second wavelength range; and
extracting, via the optical sensor system in the second invisible mode, the second message authentication code from the invisible ink printed on the document; and
authenticating the document based on a determination that the first message authentication code matches the second message authentication code.

2. The system of claim 1, wherein extracting the second message authentication code comprises:
determining, via the optical sensor system, a plurality of steganographic images;
generating, based on the text, a cryptographic hash;
in response to determining that the cryptographic hash is less than a threshold value, selecting a first steganographic image of the plurality of steganographic images; and
extracting the second message authentication code from the first steganographic image.

3. The system of claim 1, wherein generating the first message authentication code comprises:
generating concatenated text by concatenating the text with the secret key; and
inputting the concatenated text into a cryptographic hash function.

4. The system of claim 1, wherein the text comprises an indication of a recipient, an amount, and an account identification number.

5. A method comprising:
determining text on a document, the text comprising a first text portion and a second text portion;
generating a first message authentication code based on the first text portion and a cryptographic key;
determining, based on the second text portion, a first wavelength range of a light spectrum to use to scan the document;
extracting, via one or more sensors, based on the first wavelength range, a wavelength indicator from a first coded image printed on the document, wherein the wavelength indicator indicates a second wavelength range of the light spectrum;

determining, via the one or more sensors, based on the wavelength indicator, the second wavelength range to use to scan the document;

extracting, via the one or more sensors, based on the second wavelength range, a second message authentication code from a second coded image printed on the document; and authenticating the document based on a determination that the first message authentication code matches the second message authentication code.

6. The method of claim 5, wherein determining the first wavelength range comprises:

determining, based on the text, an expiration date of the document; and determining, based on the expiration date, the first wavelength range.

7. The method of claim 5, wherein determining the first wavelength range comprises:

generating, based on the text, a cryptographic hash; and in response to determining that the cryptographic hash is greater than a threshold value, selecting the first wavelength range from a plurality of wavelength ranges.

8. The method of claim 5, wherein the cryptographic key comprises a first public key of a key pair, the method further comprising:

determining a third-party certificate on the document; and determining, based on a second public key corresponding to the third-party certificate, that the third-party certificate is valid.

9. The method of claim 5, wherein the wavelength indicator comprises a first invisible-ink-printed pattern, and wherein the second message authentication code comprises a second invisible-ink-printed pattern that overlaps with the first invisible-ink-printed pattern.

10. The method of claim 5, wherein extracting the second message authentication code comprises:

determining, via the one or more sensors, a plurality of steganographic images;

generating, based on the text, a cryptographic hash;

in response to determining that the cryptographic hash is less than a threshold value, selecting a first steganographic image of the plurality of steganographic images; and extracting the second message authentication code from the first steganographic image.

11. The method of claim 5, wherein determining the first wavelength range comprises:

retrieving a data structure comprising a plurality of wavelengths and a plurality of dates, wherein each date of the plurality of dates is mapped to a wavelength of the plurality of wavelengths; and determining, based on the data structure and a date of the document, the first wavelength range.

12. The method of claim 5, wherein generating the first message authentication code comprises:

generating concatenated text by concatenating the text with the cryptographic key; and inputting the concatenated text into a cryptographic hash function.

13. One or more non-transitory, computer-readable media comprising instructions that when executed by one or more processors, causes operations comprising:

determining text on a document, the text comprising a first text portion and a second text portion;

generating a first authentication code based on the first text portion and a secret key;

determining a first wavelength range based on the second text portion;

extracting, via one or more sensors and based on the first wavelength range, a wavelength indicator from a first coded representation on the document, wherein the wavelength indicator indicates a second wavelength range;

extracting, via the one or more sensors and based on the second wavelength range indicated by the wavelength indicator, a second authentication code from a second coded representation on the document; and authenticating the document based on a determination that the first authentication code matches the second authentication code.

14. The one or more non-transitory, computer-readable media medium of claim 13, wherein determining the first wavelength range:

determining an expiration date of the document; and determining, based on the expiration date, the first wavelength range.

15. The one or more non-transitory, computer-readable media of claim 13, wherein determining the first wavelength range comprises:

generating, based on the text, a cryptographic hash; and in response to determining that the cryptographic hash is greater than a threshold value, selecting the first wavelength range from a plurality of wavelength ranges.

16. The one or more non-transitory, computer-readable media of claim 13, wherein the secret key comprises a first public key of a key pair, wherein the instructions, when executed, cause operations further comprising:

determining a third-party certificate on the document; and determining, via a second public key corresponding to the third-party certificate, that the third-party certificate is valid.

17. The one or more non-transitory, computer-readable media of claim 13, wherein the wavelength indicator comprises a first invisible-ink-printed pattern, and wherein the second authentication code comprises a second invisible-ink-printed pattern that overlaps with the first invisible-ink-printed pattern.

18. The one or more non-transitory, computer-readable media of claim 13, wherein generating the first authentication code comprises:

determining, via the one or more sensors, a plurality of steganographic images;

generating, based on the text, a cryptographic hash;

in response to determining that the cryptographic hash is less than a threshold value, selecting a first steganographic image of the plurality of steganographic images; and extracting the first authentication code from the first steganographic image.

19. The one or more non-transitory, computer-readable media of claim 13, wherein determining the first wavelength range comprises:

retrieving a data structure comprising a plurality of wavelengths and a plurality of dates, wherein each date of the plurality of dates is mapped to a wavelength of the plurality of wavelengths; and determining, based on the data structure and a date of the document, the first wavelength range.

20. The one or more non-transitory, computer-readable media of claim 13, wherein generating the first authentication code comprises:

generating concatenated text by concatenating the text with the secret key; and inputting the concatenated text into a cryptographic hash function.

* * * * *